United States Patent
Scholze et al.

(10) Patent No.: US 7,536,038 B2
(45) Date of Patent: May 19, 2009

(54) METHOD AND ARRANGEMENT FOR ASSESSING THE QUALITY OF SKIN PRINT IMAGES

(75) Inventors: Steffen Scholze, Hamburg (DE); Reinhard Meier, Buxtehude (DE)

(73) Assignee: NXP B.V., Eindhoven (NL)

( * ) Notice: Subject to any disclaimer, the term of this patent is extended or adjusted under 35 U.S.C. 154(b) by 528 days.

(21) Appl. No.: 10/525,836

(22) PCT Filed: Aug. 20, 2003

(86) PCT No.: PCT/IB03/03694

§ 371 (c)(1),
(2), (4) Date: Feb. 25, 2005

(87) PCT Pub. No.: WO2004/021261

PCT Pub. Date: Mar. 11, 2004

(65) Prior Publication Data

US 2006/0126907 A1 Jun. 15, 2006

(30) Foreign Application Priority Data

Aug. 28, 2002 (DE) .............................. 102 39 342

(51) Int. Cl.
*G06K 9/00* (2006.01)
(52) U.S. Cl. ..................... 382/124; 382/260
(58) Field of Classification Search ................... 382/124
See application file for complete search history.

(56) References Cited

U.S. PATENT DOCUMENTS

| | | | | |
|---|---|---|---|---|
| 5,926,555 A * | 7/1999 | Ort et al. | ..................... | 382/124 |
| 5,963,656 A * | 10/1999 | Bolle et al. | .................. | 382/124 |
| 6,263,091 B1 * | 7/2001 | Jain et al. | ................... | 382/125 |
| 2004/0042645 A1 * | 3/2004 | Wang | ......................... | 382/125 |
| 2005/0232472 A1 * | 10/2005 | Scholze | ...................... | 382/124 |
| 2006/0120575 A1 * | 6/2006 | Ahn et al. | ................... | 382/124 |
| 2006/0126907 A1 * | 6/2006 | Scholze et al. | .............. | 382/124 |
| 2007/0047783 A1 * | 3/2007 | Kim et al. | ................... | 382/124 |

OTHER PUBLICATIONS

Bazen, A., Gerez, S.H., "Directional Field Computation for Fingerprints Based on the Principal Component Analysis of Local Gradients", ProRISC 2000 Workshop on Circuits, Systems and Signal Processing, Veldhoven, The Netherlands, Nov. 2000.*

Eyung Lim et al: "Fingerprint Quality and Validity Analysis" Proceedings 2002 International Conference on Image Processing. ICIP 2002. Rochester, Ney, Sep. 22-25, 2002. vol. 2 of 3.

* cited by examiner

*Primary Examiner*—Matthew C. Bella
*Assistant Examiner*—Sath V. Perungavoor

(57) ABSTRACT

In a method and an arrangement for assessing the quality of skin print images, and particularly fingerprint images, provision is made for gradients to be formed for the individual picture elements (pixels) of the skin print image, for a mean value to be formed from the gradients of the pixels in one region of the image (tile) at a time, and for similarities in the mean values from tile to tile to form a measure of quality.

3 Claims, 2 Drawing Sheets $$A_x = \sum_{k,l=1}^{\max-1} \overbrace{\left(\begin{array}{c}(g_x)_{k,l} \\ (g_y)_{k,l}\end{array}\right)\left(\begin{array}{c}(g_x)_{k+1,l} \\ (g_y)_{k+1,l}\end{array}\right)},$$

$$A_{xy} = \sum_{k,l=1}^{\max-1} \overbrace{\left(\begin{array}{c}(g_x)_{k,l} \\ (g_y)_{k,l}\end{array}\right)\left(\begin{array}{c}(g_x)_{k+1,l+1} \\ (g_y)_{k+1,l+1}\end{array}\right)},$$

$$A = \sum_{k,l=1}^{\max} \overbrace{\left(\begin{array}{c}(g_x)_{k,l} \\ (g_y)_{k,l}\end{array}\right)},$$

$$A_y = \sum_{k,l=1}^{\max-1} \overbrace{\left(\begin{array}{c}(g_x)_{k,l} \\ (g_y)_{k,l}\end{array}\right)\left(\begin{array}{c}(g_x)_{k,l+1} \\ (g_y)_{k,l+1}\end{array}\right)},$$

$$A_{yx} = \sum_{k,l=1}^{\max-1} \overbrace{\left(\begin{array}{c}(g_x)_{k,l} \\ (g_y)_{k,l}\end{array}\right)\left(\begin{array}{c}(g_x)_{k+1,l} \\ (g_y)_{k+1,l}\end{array}\right)},$$

FIG. 3

METHOD AND ARRANGEMENT FOR ASSESSING THE QUALITY OF SKIN PRINT IMAGES

The invention relates to a method of assessing the quality of skin print images, and particularly fingerprint images. The invention further relates to an arrangement for carrying out a method of this kind.

When images are made of fingerprints or other skin prints, there may be various factors that have an adverse effect on their quality and, both when a set of reference prints is being assembled and when fingerprints are subsequently checked or identified, these may cause problems that either make any checking or identification impossible or may even lead to erroneous results. Depending on the principle and construction of the sensors used, the quality of the images made may be adversely affected by dirt or moisture, grease on the finger, or a finger that is too dry. Dirt and fouling in or on the sensor itself is another possible cause of images of poor quality of prints from the skin. Added to this, there is also the possibility of incorrect operation by the user himself.

Inferior quality images of skin prints generally result in the images being rejected but, if the worst comes to the worst, they may result in the system being compromised if, due to its poor quality, the skin print is wrongly accepted as correct. It is therefore important to be able to assess the quality of the image that is made of a fingerprint.

It is therefore an object of the present invention to specify a method of determining the quality of images of skin prints, and particularly of fingerprint images. It is also an object of the invention to provide an arrangement for carrying out a method of this kind.

This object is achieved, in accordance with the invention, in that gradients are formed for the individual picture elements (pixels) of the skin print images, in that a mean value is formed from the gradients of the pixels in one region of the image (tile) at a time, and in that similarities in the mean values from tile to tile form a measure of quality.

In calculating gradients, which in the end are to specify the directions of the ridges, also gradients in the opposite direction are calculated, though these too in the end represent an identical direction of the ridges. To eliminate the sign when this is done, provision is made in an advantageous embodiment of the invention for the gradients formed initially, which have the components $g_{x(alt)}$ and $g_{y(alt)}$, to be squared after the fashion of complex numbers by the formulas $g_x = g_{x(alt)}^2 - g_{y(alt)}^2$ and $g_y = 2g_{x(alt)} * g_{y(alt)}$.

It is assumed for the purposes of the invention that in skin print images the direction of the ridges changes only slightly from one tile to the adjacent one. This presupposes that the complete skin print image is divided into a sufficiently large number of tiles, which is necessary anyway for a later analysis, and in particular for an extraction of the characteristic features. In this way, the size of the tiles may be 10×10 pixels, for example.

A particularly advantageous manner of determining whether the mean values change to a greater or lesser degree from tile to tile comprises, in another embodiment, entering the mean values in two directional matrices for x and y, in that scalar products are formed of the directional matrices together with the matrices that are displaced horizontally, vertically and in the directions of both diagonals by one tile, in that each of the products that were obtained in that way by multiplying the matrices are summed over all the tiles, and in that the sums are added together and are divided by the sum of the scalar products of the directional matrices with themselves in order to form the quality measure, said sum of the scalar products of the directional matrices with themselves being summed up over all tiles.

The sensor usually covers a rectangular area, in which case the finger does not rest on the sensor in the edge or corner regions. The areas that are thus not occupied by the finger may in certain cases prove a nuisance when quality is being assessed. This is not so much the case with sensors in which the areas not occupied by the finger, i.e. the areas lying outside what is termed the region of interest (ROI), are homogeneous. However, use is also made of sensors that produce a raster pattern or stripes outside the region of interest. With sensors of this type, it is advisable for the assessment of quality to be confined to the region of interest.

To enable the region of interest to be determined for this purpose, provision may be made, in another embodiment, for the lengths of the gradients for which mean values have been formed to be used to determine a region of interest of the skin print that has been scanned.

The arrangement according to the invention is advantageously arranged to have digital signal processing means to perform the method steps according to the invention. Recourse may be had in this case to systems that are known per se for individual steps of the signal processing.

These and other aspects of the invention are apparent from and will be elucidated with reference to the embodiments described hereinafter.

In the drawings:

FIG. 3 shows equations for calculating the quality measure.

Figure 1:
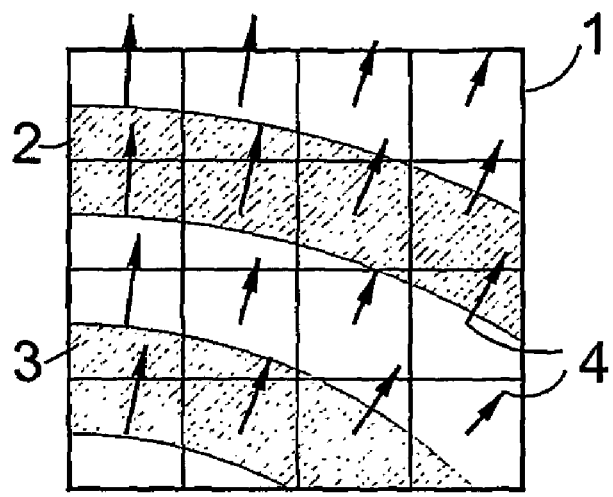
FIG. 1 is a diagrammatic representation of the gradients determined within a tile.

For the sake of clarity, the tile 1 shown in FIG. 1 has only 4×4 pixels. Within the tile there are—once again as a major simplification—parts of two ridges 2, 3 that, for the purposes of the rules relating to drawings for patents, have been shown as hatched bars. Also, no allowance has been made in the representation either for the characteristic followed by the gray levels or for any local quantization by the scanning process. For each pixel, there is calculated by methods that are known per se a gradient 4 that—as described above—does not depend on the sign of the edges of the ridges 2, 3. Since the ridges do not have a particularly pronounced curvature at the majority of points in the skin print image, the gradients assume substantially similar directions.

The length of the gradients too is not a faithful representation of reality. It has merely been indicated that the gradients may be of different lengths. For further processing, the components in the x and y directions are placed in respective directional matrices.

Figure 2:
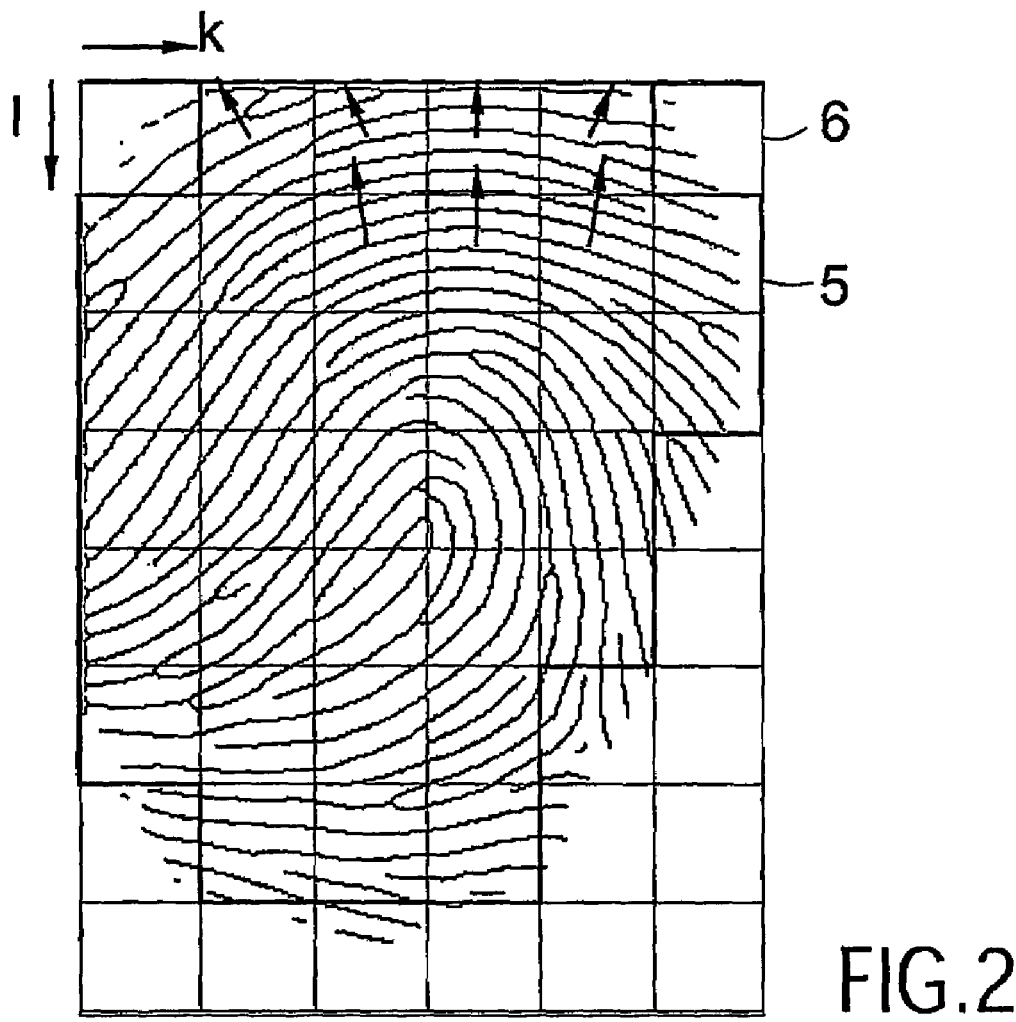
FIG. 2 shows mean values of the gradients determined over respective tiles, for the entire image.

As an illustration, FIG. 2 shows the entire image of a skin print containing representative mean values of the gradients calculated for respective ones of the tiles 1.

As already mentioned, the region of interest 5 does not cover the whole of the area scanned by the sensor. If the sensor used is one that, outside the region of interest 5, produces a homogeneous signal, such as black or white for example, then it is perfectly possible for the entire area 6 to be covered in the subsequent steps of the method according to the invention. In the tiles that are situated outside the region of interest, the mean values obtained for the gradients then become zero and hence are no nuisance. The same is true for tiles of which only part is situated in the region of interest 5.

To form the quality measure, an autocorrelation is performed of the mean values g. For this purpose, scalar products $A_x$, $A_y$, $A_{xy}$ and $A_{yx}$ are formed using the equations shown in FIG. 3. Also, the value A is derived as a center for the autocorrelation. The quality measure Q is then calculated as $Q=(A_x+A_y+A_{xy}+A_{yx})/4A$.

The summing is performed in each case for the entire area 6, namely from k=1 and l=1 to their maximum values.

The invention claimed is:

1. An arrangement for assessing the quality of skin print images, and particularly fingerprint images, characterized by a system for calculating gradients for pixels of a skin print image such that a gradient is calculated for each pixel of the skin print image, a mean value derived from the gradients of the pixels in each region of the skin print image, and a measure of quality from similarities in the mean values from region to region, wherein the system is arranged to enter the mean values in two directional matrices for x and y, to form scalar products of the directional matrices having matrices that are displaced horizontally, vertically and in the directions of both diagonals by one region, to sum, over all the regions of the skin print image, each of the products that are obtained by multiplying the matrices, and to form the quality measure by adding the sums together and dividing the scalar products of the directional matrices, said scalar products having been summed over all the regions, by themselves, wherein the quality measure is calculated using the following equation:

$$Q = \frac{(A_x + A_y + A_{xy} + A_{yx})}{4A},$$

where Q is the quality measure and $A_x$, $A_y$, $A_{xy}$, and $A_{yx}$ are the scalar products, wherein $A_x$, $A_y$, $A_{xy}$, $A_{yx}$ and A are computed using the following equations:

$$A_x = \sum_{k,l=1}^{max-1} \left\langle \begin{bmatrix} (g_x)_{k,l} \\ (g_y)_{k,l} \end{bmatrix}, \begin{bmatrix} (g_x)_{k+1,l} \\ (g_y)_{k+1,l} \end{bmatrix} \right\rangle,$$

$$A_y = \sum_{k,l=1}^{max-1} \left\langle \begin{bmatrix} (g_x)_{k,l} \\ (g_y)_{k,l} \end{bmatrix}, \begin{bmatrix} (g_x)_{k,l+1} \\ (g_y)_{k,l+1} \end{bmatrix} \right\rangle,$$

$$A_{xy} = \sum_{k,l=1}^{max-1} \left\langle \begin{bmatrix} (g_x)_{k,l} \\ (g_y)_{k,l} \end{bmatrix}, \begin{bmatrix} (g_x)_{k+1,l+1} \\ (g_y)_{k+1,l+1} \end{bmatrix} \right\rangle,$$

$$A_{yx} = \sum_{k,l=1}^{max-1} \left\langle \begin{bmatrix} (g_x)_{k+1,l} \\ (g_y)_{k+1,l} \end{bmatrix}, \begin{bmatrix} (g_x)_{k,l+1} \\ (g_y)_{k,l+1} \end{bmatrix} \right\rangle, \text{ and}$$

$$A = \sum_{k,l=1}^{max} \left\langle \begin{bmatrix} (g_x)_{k,l} \\ (g_y)_{k,l} \end{bmatrix}, \begin{bmatrix} (g_x)_{k,l} \\ (g_y)_{k,l} \end{bmatrix} \right\rangle.$$

2. An arrangement as claimed in claim 1, characterized in that the system is arranged to square the initially calculated gradients, which have the components $g_{x(alt)}$ and $g_{y(alt)}$, after the fashion of a complex number by the formulas $g_x = g_{x(alt)}^2 - g_{y(alt)}^2$ and $g_y = 2g_{x(alt)}^* g_{y(alt)}$.

3. An arrangement as claimed in claim 1, characterized in that the system is arranged to determine, from the lengths of the averages gradients, a region of interest of the skin print that has been scanned.

* * * * *